May 1, 1962 W. B. SEIDEL 3,031,897
MACHINE TOOL ANTI-BACKLASH MOTION TRANSMITTING MECHANISM
Filed March 16, 1960
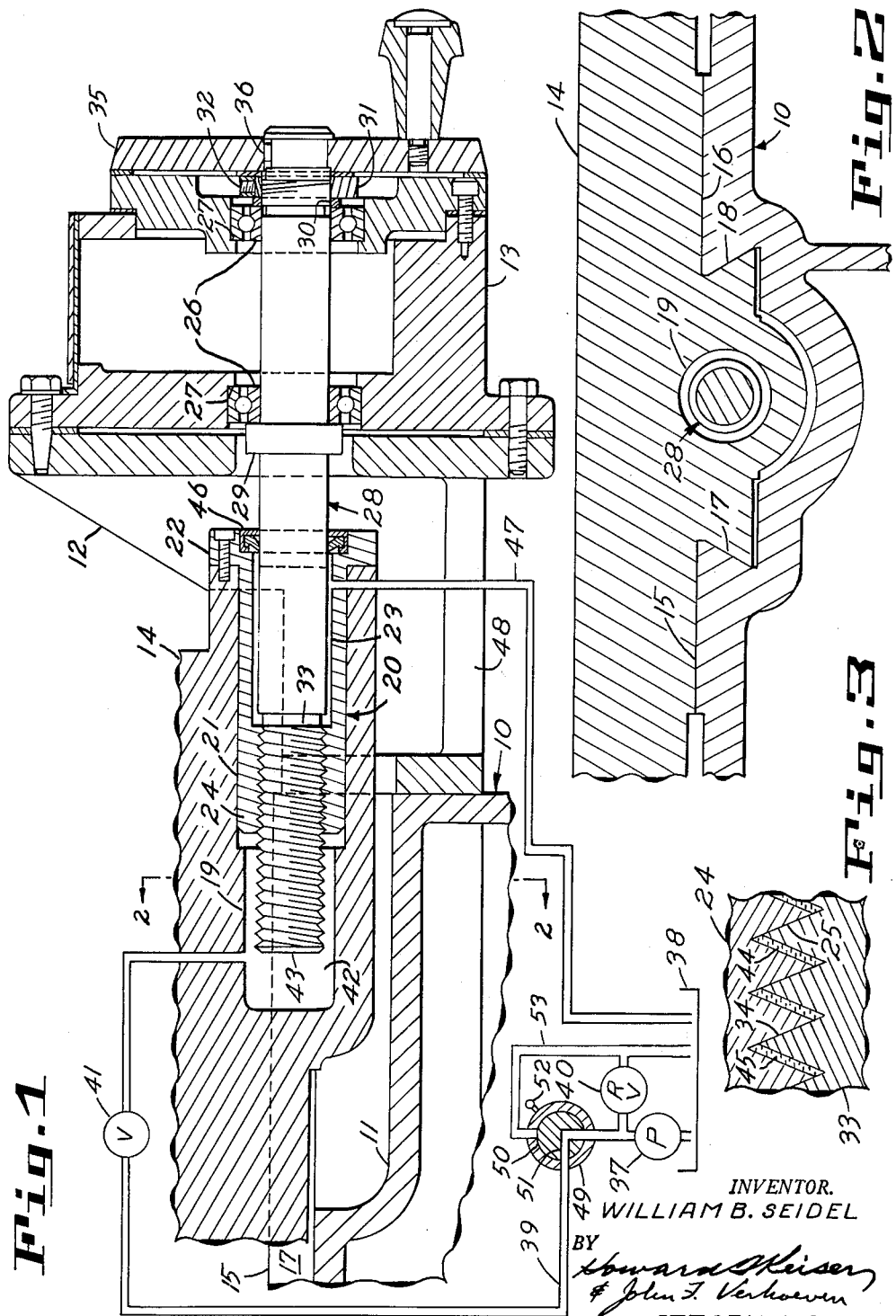
INVENTOR.
WILLIAM B. SEIDEL
BY
Howard Keiser
& John F. Verhoeven
ATTORNEYS

United States Patent Office 3,031,897
Patented May 1, 1962

3,031,897
MACHINE TOOL ANTI-BACKLASH MOTION TRANSMITTING MECHANISM
William B. Seidel, Cincinnati, Ohio, assignor to The Cincinnati Milling Machine Co., Cincinnati, Ohio, a corporation of Ohio
Filed Mar. 16, 1960, Ser. No. 15,338
8 Claims. (Cl. 74—441)

The present invention relates to a screw and nut mechanism for movement of one machine tool member relative to another without backlash.

In many machine tool motion transmitting mechanisms a screw connected to one machine tool member is engaged with a nut connected to another machine tool member, and the nut or the screw is rotatable to effect relative movement between the machine tool members. In mechanisms of this type it is conventional to have a second nut on the screw, spaced from the motion transmitting nut connected to the machine tool member, and to have means to urge the nuts towards or away from each other to hold the threads of the motion transmitting nut and screw in firm engagement, thereby eliminating backlash between the motion transmitting elements, and the respective machine tool members to which the elements are connected.

While this type of mechanism provides the desired axial force between the motion transmitting nut and screw to hold these members in firm anti-backlash engagement, it also substantially increases the force required to rotate one of said motion transmitting elements relative to the other to produce the desired movement between the machine tool members. This is because the force resisting relative rotation of the motion transmitting elements is increased not only by the addition of the second nut, but by a substantial friction force caused by the threads of both nuts being urged against the thread of the screw. If substantial relative movement between the machine tool members is required, particularly at a rapid rate, the friction between the two nuts and screw will, on relative rotation of the elements, raise the temperature of the elements of the mechanism and produce expansion thereof. With this expansion, high precision movement of the machine tool members becomes difficult or impossible. In mechanisms of this type, the power to effect the desired relative movement of the machine tool members is transmitted through the screw and nut.

In the mechanism of the present invention, the backlash between a motion transmitting nut and screw is eliminated without the use of a second nut. In the preferred form of the invention, although an axial force is provided to urge the threads of the motion transmitting elements together, there is a minimum resistance to relative rotation therebetween. Thus, the tendency for generation of heat in the mechanism is greatly reduced, and the effect on the accuracy of the mechanism of any heat which may be generated, even when rapid, extensive movement between the members is required, is minimized. In the preferred embodiment of the invention disclosed herein a pressure chamber is provided on one side of the threadedly engaged portions of the screw and nut, and an exhaust chamber is provided on the other side thereof. The nut is secured in the member having the pressure chamber therein, and the terminal face of the screw is in, or in communication with, the pressure chamber. Oil under pressure in that chamber produces an axial force between the screw and the nut, and hence the thread on the screw is held in firm engagement with the thread on the nut. The threads define a relatively long helix passage connecting the pressure and exhaust chambers, which passage, because of its size and conformation, provides sufficient resistance to maintain pressure in the pressure chamber but, at the same time, permits a continuous seepage of oil through the threads. This seepage not only maintains a supply of oil adjacent the contacting faces of the threads for lubrication thereof, but tends to maintain the temperature of the elements at the temperature of the oil, carrying away excessive heat which may be generated by rapid or substantial relative rotation between the contacting thread faces. Moreover, the force which moves one member relative to the other is not transmitted through the screw and nut, but is supplied by the hydraulic oil under pressure, and the screw and nut mechanism acts as an adjustable positive stop which controls that movement. Thus, in the preferred embodiment of the invention, the hydraulic oil provides the desired relative axial force between the motion transmitting elements to assure firm anti-backlash engagement, lubricates said elements to reduce resistance to relative rotation to a minimum, helps stabilize the temperature of the positioning elements if substantial or rapid movement of the machine tool members is required, and provides the force which effects the relative movement between the machine tool members.

It is therefore one object of the present invention to provide an improved mechanism for relatively positioning machine tool members without backlash therebetween.

It is another object of the present invention to provide a backlash eliminating screw and nut motion transmitting mechanism for machine tools, which has minimum resistance to relative rotation of the screw and nut.

It is another object of the present invention to provide a screw and nut motion transmitting mechanism without backlash operable to dissipate excessive heat which may be generated in the motion transmitting elements on rapid or extensive relative movement of the members.

It is another object of the present invention to provide a motion transmitting mechanism in which movement between machine tool members is controlled by a screw and nut mechanism acting as a positive stop.

Other objects and advantages of the present invention should be readily apparent by references to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a cross-sectional view of the mechanism of the present invention;

FIG. 2 is a view taken on line 2—2 of FIG. 1; and

FIG. 3 is an enlarged view of the engaged threads of the screw and nut showing the helix passage therethrough.

There is shown in FIGS. 1 and 2 a machine tool member indicated generally at 10 which, in the illustrative embodiment described herein, comprises a stationary base 11, a bracket 12 connected to the base, and a hub 13 connected to the bracket. A second machine tool member 14, which may, for example, be a slide mounted on the base, is movable relative to the first machine tool member. The base has a flat slide surface 15 to receive the slide surface 16 of the slide, and has a dovetailed recess 17 in the surface 15 to receive a dovetailed depending guide portion 18 of the slide. The guide portion 18 of the slide has a hole 19 terminating therein. A nut, indicated generally at 20, has a body 21 snugly received in the hole, a head 22 connected to the slide, an internal chamber 23, and a threaded portion 24 having an internal thread 25 between the chamber 23 and the end of the nut.

The hub 13 has a pair of spaced ball bearings 26 mounted therein, the inner side of each engaging a shoulder 27 in the hub. A screw, indicated generally at 28, is received in the bearings 26 for rotation therein and is connected to the hub 13 through the bearings and restraining means engaging the outer sides of the bearings to prevent axial movement of the screw relative to the hub. The restraining means include an integral collar 29 on the screw engaging one bearing and a spacer 30 held against the other bearing by a collar 31 threadedly engaged with screw 28 and secured thereon by set screw 32. The screw 28 extends through chamber 23 in the nut and has a threaded portion 33 with an external thread 34 thereon engaged with the threaded portion 24 of the nut. Rotation of the screw 28 is effected by rotation of a wheel 35 keyed to the screw at 36.

A hydraulic pump 37 delivers hydraulic oil from sump 38 to pressure line 39, relief valve 40 being connected to line 39 and discharging to sump 38. Line 39 contains a conventional adjustable pressure reducing valve 41 and terminates at hole 19 in slide 14, the line 39 defining an inlet passage for fluid under predetermined pressure to a pressure chamber 42 defined by the hole 19 and the end of the nut 20. Screw 28, which is connected to the stationary machine tool member 10, has a terminal face 43 exposed to pressure chamber 42 and thus the slide 14 is urged to the left (as viewed in FIG. 1) when fluid under pressure is in chamber 42 and the thread 25 of the nut is thus urged into anti-backlash engagement with the thread 34 of the screw as shown in FIG. 3. The helix angle of the threads of the nut and screw is sufficiently small so that the screw is not rotated by the axial force exerted between the screw and the nut by oil under pressure in chamber 42. Instead, the screw acts as a positive stop, holding the slide 14 against movement until the screw is rotated in a direction to move the nut out on the screw by wheel 35, the screw thereby controlling the power supplied by the oil which moves the slide to the left. When the screw is turned in the opposite direction, the force of any oil under pressure in chamber 42 would oppose movement of the slide to the right so means are provided selectively to release pressure from chamber 42. This may be accomplished by a valve 49 having a core 50 with a passage 51 therein, the core rotatable by handle 52 to disconnect line 39 from the pressure pump and connect said line to line 53 leading to sump 38.

The threads 25 and 34 of the respective motion transmitting elements 20 and 28 define a relatively long helix passage 44 which, when the thread of the nut is urged against the thread of the screw, appears as shown in FIG. 3. This passage 44 provides a discharge passage from chamber 42 and oil, as at 45, continuously seeps therethrough. Although oil is continuously discharged from chamber 42 the resistance of the helical passage 44 through the threads is sufficiently high that a desired pressure can be maintained in chamber 42 to provide the desired axial force between nut 24 and screw 28. This continuous supply of oil not only maintains lubrication of the engaging faces of the threads but will serve to stabilize the temperature of the motion transmitting elements if any significant amount of heat is generated by rotation of the screw as might occur, for example, when slide member 14 is moved a substantial distance at high speed.

The internal nut chamber 23 is sealed by an annular seal 46 secured in head 22 of the nut and engaged in rotatable sealing relation with the screw 23 which extends therethrough. The chamber 23 is connected to the sump 38 by return line 47 and thereby chamber 23 defines an exhaust chamber connected to the pressure chamber 42 by the thread passage 44. It will be noted return line 47 passes through a slot 48 in bracket 12, and at least portions of the pressure and return line 39 and 47, respectively, are flexible so that slide 14 may move freely on base 11.

What is claimed is:

1. In a machine tool, a pair of machine tool members, one of said members having a screw connected thereto and the other of said members having a threaded portion therein to threadedly receive the screw, said screw having a face thereon, means to effect relative rotation between the screw and said threaded portion, and means defining a pressure chamber on said other member in communication with the face on the screw to produce an axial force between the screw and said threaded portion, said chamber and said face relatively movable in the axial direction by pressure in the pressure chamber during said relative rotation.

2. In a machine tool, a pair of machine tool members, a first threaded element connected to one of said machine tool members and received in the other machine tool member, said element having a face thereon, a second threaded element connected to the other of said machine tool members and in threaded engagement with said first threaded element, one of said threaded elements rotatable relative to the other, and means defining a pressure chamber in said other machine tool member in communication with the face on said first threaded element, said chamber and said face relatively movable by pressure in the pressure chamber during relative rotation between the threaded elements.

3. In a machine tool, a first machine tool member, a second machine tool member having a chamber therein, motion transmitting elements comprising a screw connected to said first machine tool member and a nut connected to the second machine tool member, said nut in threaded engagement with the screw, one of said motion transmitting elements rotatable relative to the other, means defining a face on the screw in communication with the chamber, said face and said chamber relatively movable when said one motion transmitting element is rotated relative to the other, and means to maintain an elevated pressure in said chamber to urge the threads of the nut and screw into firm engagement and to effect relative movement of the machine tool members when said one motion transmitting element is rotated relative to the other.

4. In a machine tool, a first machine tool member, a second machine tool member having a hole terminating therein, means to supply oil under pressure to said hole, relatively rotatably motion transmitting elements comprising a nut having an internal thread received in the hole and a screw connected to said first machine tool member having an external thread engaged with the thread of the nut, said threads defining an oil discharge passage from the hole, said screw having a terminal face in communication with the hole whereby the threads of the screw and nut are urged together by pressure in the hole and on relative rotation of said elements said pressure effects relative movement between said machine tool members.

5. In a machine tool having a source of fluid under pressure, a first machine tool member, a second machine tool member having a hole terminating therein, a nut snugly and nonrotatably secured in the hole, said nut and hole defining a chamber, a screw rotatably connected to the first machine tool member threadedly engaged with the nut and having a terminal face thereon in communication with said chamber, said screw and nut defining a helical discharge passage from said chamber, and means connecting said chamber to said source of fluid under pressure.

6. In a machine tool having a source of fluid under pressure and a sump, a first machine tool member, a second machine tool member having a hole terminating therein, a nut snugly and nonrotatably secured in the hole and having an internal thread therein, said nut and hole defining a chamber at each end of the nut thread, a screw rotatably connected to the first machine tool member and having a terminal face thereon, said screw threadedly received in the nut with the face thereof in one of said chambers, means connecting said one chamber to the source of pressure, and means connecting the other chamber to the sump.

7. In a machine tool having a source of oil under pressure and a sump, a first machine tool member, a second machine tool member slidably mounted on the first machine tool member, one of said members having a a hole terminating therein, a nut snugly and non-rotatably secured in the hole and terminating short of the end of the hole to define a chamber in the hole, said nut having an internal chamber and an internal threaded portion between said internal chamber and the end of the nut, a screw rotatably connected to the other of said machine tool members having a threaded portion engaged with the threaded portion of the nut and having a terminal face in communication with the hole chamber, the engaged threaded portions of the screw and nut defining a high resistance discharge passage from the hole chamber to the nut chamber, means connecting the hole chamber to the source of oil under pressure, and means connecting the nut chamber with the sump.

8. In a machine tool having a source of oil under pressure and a sump, a first machine tool member, a second machine tool member slidably mounted on the first machine tool member and having a hole terminating therein, a nut snugly and nonrotatably secured in the hole and terminating short of the end of the hole to define a chamber in the hole, said nut having an internal chamber and an internal threaded portion between said internal chamber and the end of the nut, a screw rotatably connected to the first machine tool member extending through the nut chamber and having a threaded portion engaged with the threaded portion of the nut, the engaged threaded portions of the screw and nut defining a high resistance discharge passage from the hole chamber to the nut chamber, said screw having a terminal face in communication with the hole chamber, means to seal the nut chamber about the screw, means connecting the nut chamber with the sump, and means selectively connecting the hole chamber to the source of oil under pressure to urge the threads of the nut and screw into firm engagement and to effect relative movement of the machine tool members when the screw is rotated relative to the nut.

References Cited in the file of this patent

UNITED STATES PATENTS

| | | |
|---|---|---|
| 2,320,353 | Ernst et al. | June 1, 1943 |
| 2,337,223 | Armitage | Dec. 21, 1943 |